United States Patent [19]

Bertram

[11] Patent Number: 4,577,129
[45] Date of Patent: Mar. 18, 1986

[54] ELECTRIC MOTOR HAVING TWO CO-PLANAR STATOR SECTIONS

[75] Inventor: Leo Bertram, Stolberg, Fed. Rep. of Germany

[73] Assignee: U.S. Philips Corporation, New York, N.Y.

[21] Appl. No.: 571,283

[22] Filed: Jan. 16, 1984

[30] Foreign Application Priority Data

Jan. 17, 1983 [DE] Fed. Rep. of Germany ....... 3301264

[51] Int. Cl.⁴ ............................................. H02K 7/20
[52] U.S. Cl. .................................. 310/112; 310/112; 310/163; 310/49 R
[58] Field of Search ............... 310/112, 114, 113, 126, 310/40 MM, 49, 162–165

[56] References Cited

U.S. PATENT DOCUMENTS

| | | | |
|---|---|---|---|
| 2,025,560 | 12/1935 | Warren | 310/163 |
| 2,081,993 | 6/1937 | Gebhardt | 310/164 |
| 2,484,001 | 10/1949 | Raymond | 310/254 |
| 3,241,111 | 3/1966 | Sandstrom | 310/254 |
| 3,863,084 | 1/1975 | Hasebe | 310/114 X |
| 3,936,680 | 2/1976 | Kuwako | 310/40 MM |

*Primary Examiner*—Donovan F. Duggan
*Attorney, Agent, or Firm*—David R. Treacy

[57] ABSTRACT

An electric motor having two stator sections having co-planar central parts extending between first and second co-planar pole pairs. An excitation coil is provided around each stator central part, and the pole shoes forming the pole pairs are spaced from the coil ends. The stators are preferably laminated from iron sheets, corresponding parts of the sheets of the two sections being co-planar.

6 Claims, 2 Drawing Figures

ELECTRIC MOTOR HAVING TWO CO-PLANAR STATOR SECTIONS

BACKGROUND OF THE INVENTION

The invention relates to an electric motor, in particular a single-phase synchronous motor, having parallel stator iron sections or shanks on which excitation coils are slid and which have oppositely located pole shoes on shank parts projecting from the excitation coils, between which rotor parts are provided.

Electric motors having parallel iron shanks are, for example, series-, split-pole- or single-phase synchronous motors. The rotors which rotate between the stator pole shoes of the parallel iron shanks are preferably constructed to be permanent magnetic with a diametrical magnetization. Such motors are used, for example, in electric household appliances, for example, citrus fruit squeezers or can openers. In particular in single-phase synchronous motors, the operating behaviour is partly disturbed by retentive forces of the permanent magnetic rotor.

SUMMARY OF THE INVENTION

It is the object of the invention to provide an electric motor in which the forces of attraction are removed or compensated for partly.

According to the invention this object is achieved in that the iron of the shanks projects from the excitation coils on each side of said coils, the projecting shank parts form pairwise oppositely located pole shoes, the projecting shank parts, in the area between the pole shoes and the excitation coils, are bend through 90° with respect to the plane in which the iron shanks lie within the coils so that the center lines of rotor parts provided between the pole shoes are in alignment with each other, the poles of the rotor parts are provided on a common shaft, and these poles and/or the pole shoe pairs are provided so as to be angularly shifted with respect to each other.

As a result of the angular shift of one or both pole sets (the rotor poles) and/or the pole shoe pairs, the retentive torque can substantially be compensated for.

According to a further embodiment of the invention the poles of the rotors are shifted relative to each other by an angle $\alpha$ of at most 90°. With such a shift the sticking torque is reduced even more effectively.

According to a further embodiment of the invention the pole shoe pairs are shifted by an angle $\beta$ of at most 90°. With such a shift the sticking torque is compensated for without it being necessary to angularly shift the rotor poles. The rotor parts may hence be combined to form one rotor which is inserted in both stator apertures. For the case in which the rotor parts and also the pole shoe pairs are shifted relative to each other, according to a further embodiment of the invention the sum of the shifts must be at most 90°, so $(\alpha+\beta) \leqq 90°$.

According to a further embodiment of the invention the iron of the shanks has a considerably larger width than thickness.

The invention will be described in greater detail with reference to the embodiments shown in the drawings.

DESCRIPTION OF THE PREFERRED EMBODIMENTS

Figure 1:
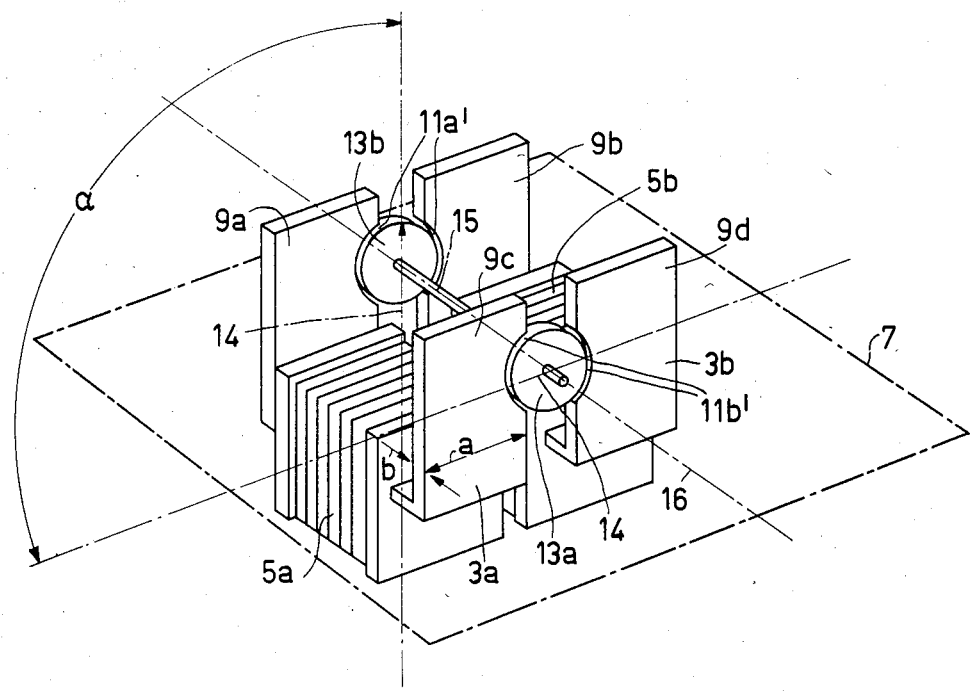
FIG. 1 shows an electric motor having two parallel stators and angularly shifted magnetization.

The iron of the motor stator consists of two iron shanks 3a, 3b on which excitation coils 5a and 5b are provided. The central parts of the iron shanks 3a and 3b extending within the coils 5a and 5b are provided in one plane 7. In the plane 7 the iron has a width a in the order of magnitude of a factor between seven and fifteen, preferably twelve, and at right angles thereto it has a thickness b in the order of magnitude of a factor one to seven, preferably five. The iron of the shanks consists of one to seven, preferably five, laminated iron sheets.

Shank parts 9a, 9b, 9c and 9d project from the coils 5a and 5b. The shank parts 9a and 9b and 9c and 9d, respectively, are pair-wise juxtaposed and form pole shoe pairs 11a, 11b. The shank parts 9a, 9b and 9c, 9d are bent out of the plane 7 by 90° in the area between the coils 5a, 5b and the pole shoe pairs 11a, 11b. As a result, the portions of the shank parts, which form the pole shoe pairs, are spaced from the ends of the coils 5a, 5b. Rotor parts 13a and 13b are provided between the pole shoe pairs. These rotor parts 13a and 13b may be constructed so as to be permanently magnetic and be diametrically magnetized. Both rotor parts 13a, 13b are mounted on a common shaft 15. The axis of rotation is denoted by 16.

The direction of magnetization 14 of the two rotor parts 13a and 13b is angularly shifted. The angular shift $\alpha$ is maximum 90°.

The number of iron sheets of the stator iron depends on the flux ratios in the rotor. Only the iron situation is to be taken into account. To permit subsequent bending of the shank parts 9a to 9d, however, it is more favorable to use as few sheets as possible. Moreover, the lamination consisting of fewer sheets is not so expensive. However, thick sheets are more difficult to bend than thinner ones. So for an economic manufacture an optimum of the dimensions is to be ensured. It has proved advantageous when the sheets have a thickness between 0.5 and 5.0 mm, preferably 1.0 mm. The stator iron is constructed to be considerably wider in the direction a than in the depth b. The width a of the stator iron, in the area of the coils in the plane 7, is proportioned to be seven to fifteen units, whereas the depth b amounts to one to seven units. A width a of twelve units and a depth b of five units are to be preferred.

When bending of the iron shanks proves difficult, it is also possible to cause the iron shanks 3a and 3b to terminate near the end of the coils 5a and 5b. Previously bent shank parts 9a to 9d may then be connected to the resulting end faces of the shanks by welding or fixing.

Figure 2:
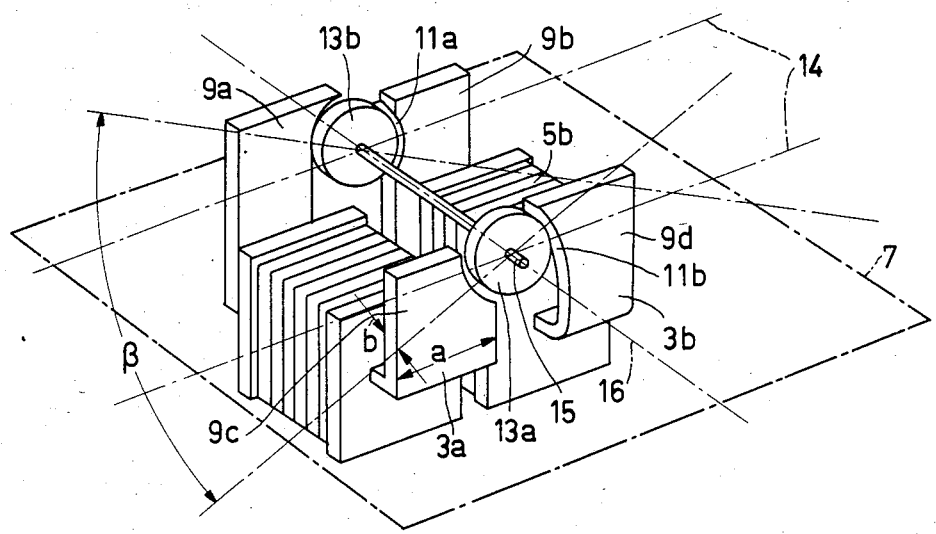
FIG. 2 shows the electric motor of FIG. 1 with angularly shifted stator poles.

The embodiment shown in FIG. 2 corresponds substantially to the FIG. 1 embodiment. On the iron shanks 3a and 3b excitation coils 5a and 5b are provided. The parts of the iron shanks 3a and 3b extending within the coils 5a and 5b lie in the plane 7. The dimensions of the iron in plane 7 correspond to the description of FIG. 1. The shank parts 9a, 9b and 9c, 9d projecting from the coils 5a and 5b are bent out of the plane 7 by 90° and form pole shoe pairs 11a and 11b. These pole shoe pairs 11a and 11b are angularly shifted through an angle $\beta$ of at most 90° with respect to each other. The permanent magnetic rotor parts 13a and 13b are not angularly shifted. In this case the rotor may be formed integral, for example, in the form of a roller.

However, it may also be advantageous when both the pole shoe pairs 11a and 11b and also the rotor parts 13a and 13b are shifted relative to each other. In this case, α and β must be chosen to be smaller than 90°. When (α+β)=90° are chosen, the sticking torque is optimally removed.

Of course it may also be desired that the sticking torque is not suppressed optimally. In these cases the angle α in FIG. 1 becomes <90°, in FIG. 2 the angle β<90° and with an angular shift of pole shoe pairs and rotor parts the angle (α+β) is chosen to be <90°.

What is claimed is:

1. An electric motor having two parallel stator sections, a respective electrical excitation coil surrounding each stator section, and a rotor rotatable about a rotor axis, characterized in that each stator section comprises an ironshank having a central part extending in a direction parallel to said rotor axis, and two respective shank parts projecting from said central part in opposite axial directions and bent to form respective poles, shank parts extending in one axial direction from said central parts forming a pair-wise juxtaposed pole shoe pair, said central parts being parallel to each other and defining a plane parallel to said rotor axis, and each pole shoe pair lying in and defining a respective plane perpendicular to said rotor axis, each excitation coil is disposed around a respective central part and defines a coil axis parallel to said rotor axis, each coil having respective ends spaced in the axial direction, each pole shoe is spaced from the ends of the respective coils, and each of said shank parts has a 90° bend in the area between the respective coil and the respective pole shoe pairs, and said rotor has two rotor parts on a common shaft, each rotor part having magnetic poles arranged to cooperate with a corresponding pole shoe pair, said rotor poles forming one pole set and said pole shoe pairs forming another pole set, the poles of at least one of said pole sets being angularly shifted with respect to each other, the sum of the shifts of the two pole sets being an angle of 90° maximum.

2. A motor as claimed in claim 1, characterized in that each shank consists of a plurality of iron sheets, in the central part of each shank the sheets being parallel to the plane defined by said central parts, in the shank parts each of said sheets being bent through said angle of 90° about an axis transverse to said rotor axis and parallel to the plane defined by said central parts.

3. A motor as claimed in claim 2, characterized in that each sheet has a thickness between 0.5 and 5.0 mm.

4. A motor as claimed in claim 3, characterized in that said thickness is 1.0 mm.

5. A motor as claimed in claim 2 or claim 3, characterized in that each shank has a relative width between 7 and 15 units in a direction lying in the plane defined by the shank central parts and in the shank parts, and a relative thickness perpendicular to said planes between 1 and 7 units.

6. A motor as claimed in claim 5, characterized in that the ratio of said width to said thickness is 12.5.

* * * * *

UNITED STATES PATENT AND TRADEMARK OFFICE
CERTIFICATE OF CORRECTION

PATENT NO. : 4,577,129

DATED : March 18, 1986

INVENTOR(S) : LEO BERTRAM

It is certified that error appears in the above-identified patent and that said Letters Patent is hereby corrected as shown below:

IN THE CLAIMS:

Claim 1, Col. 3 line 21, change "ironshank" to --iron shank--

Claim 6, Col. 4, line 33, change "12.5" to --12:5--

Signed and Sealed this

Third Day of November, 1987

Attest:

DONALD J. QUIGG

Attesting Officer

Commissioner of Patents and Trademarks